(12) United States Patent
Huige et al.

(10) Patent No.: US 7,186,428 B1
(45) Date of Patent: Mar. 6, 2007

(54) METHOD OF OXYGENATING YEAST SLURRY USING HYDROPHOBIC POLYMER MEMBRANES

(75) Inventors: Nick J. Huige, Brookfield, WI (US); Murthy Tata, Wauwatosa, WI (US); Jeffrey F. Fehring, West Bend, WI (US); Michael C. Barney, Elm Grove, WI (US); David S. Ryder, Mequon, WI (US); Alfonso Navarro, Milwaukee, WI (US)

(73) Assignee: Miller Brewing Company, Milwaukee, WI (US)

( * ) Notice: Subject to any disclaimer, the term of this patent is extended or adjusted under 35 U.S.C. 154(b) by 0 days.

(21) Appl. No.: 09/448,578

(22) Filed: Nov. 23, 1999

(51) Int. Cl.
   *C12N 1/16*   (2006.01)
   *C12C 11/00*  (2006.01)
(52) U.S. Cl. ............... 426/62; 426/16; 426/29; 424/93.51; 435/254.2
(58) Field of Classification Search ............ 426/11, 426/16, 29, 60, 62, 474; 435/70.3
   See application file for complete search history.

(56) References Cited

U.S. PATENT DOCUMENTS

| | | | |
|---|---|---|---|
| 512,311 A | 1/1894 | Manz | |
| 2,032,818 A | 3/1936 | Sweek et al. | |
| 2,040,661 A | 5/1936 | Liebmann | |
| 3,594,178 A | 7/1971 | Meisler | |
| 3,627,544 A | 12/1971 | Bosewitz et al. | |
| 3,769,176 A | 10/1973 | Hise et al. | 195/142 |
| 3,969,190 A | 7/1976 | Hise et al. | 195/142 |
| 4,097,614 A | 6/1978 | West | 426/422 |
| 4,156,025 A | 5/1979 | Dalgleish | 426/271 |
| 4,279,938 A | 7/1981 | Hildebrand | 426/424 |
| 4,298,693 A | 11/1981 | Wallace | 435/305 |
| 4,395,431 A | 7/1983 | Lance et al. | 426/600 |
| 4,425,433 A | 1/1984 | Neves | 435/163 |
| 4,550,029 A | 10/1985 | Krüger et al. | 426/487 |
| 4,610,888 A | 9/1986 | Teng et al. | 426/569 |
| 4,764,471 A * | 8/1988 | Ripka | 435/255 |
| 4,837,034 A | 6/1989 | Owades et al. | 426/16 |
| 4,978,545 A | 12/1990 | Cutayar et al. | |
| 4,978,616 A * | 12/1990 | Dean, Jr. et al. | 435/70.3 |
| 4,992,370 A | 2/1991 | Kalina | 435/161 |
| 5,266,337 A | 11/1993 | Bärwald et al. | 426/15 |
| 5,298,264 A | 3/1994 | Edens et al. | 426/8 |
| 5,925,563 A | 7/1999 | Redford | 435/300.1 |
| 5,972,394 A | 10/1999 | Kato et al. | 426/46 |
| 6,149,949 A * | 11/2000 | Coutts | 426/16 |

FOREIGN PATENT DOCUMENTS

| | | |
|---|---|---|
| BE | 1010885 A3 | 2/1999 |
| GB | 1384309 | 2/1975 |
| GB | 2197341 A | 5/1988 |
| WO | WO99/47636 | 9/1999 |

OTHER PUBLICATIONS www.processassocites.com for the description of Reynold's Number.*
Fermentation and Biochemical Engineering Handbook- Principles, Process Design and Equipment 1997, pp. 323 and 325; Edited by Vogel H.C.; Tadaro C.L.; William Andrew Publishing/Noyes.*
Masschelein, et al., "The membrane loop concept: a new approach for optimal oxygen transfer into high cell density pitching yeast suspensions," *Malting and Brewing Process*, pp. 377-386 (EBC Congress 1995).

* cited by examiner

*Primary Examiner*—Keith Hendricks
*Assistant Examiner*—Jyoti Chawla
(74) *Attorney, Agent, or Firm*—Quarles & Brady LLP

(57) ABSTRACT

Disclosed is a an economical method of efficiently oxygenating yeast slurry without bubble formation. The method employs a membrane oxygenator comprising at least one hydrophobic, microporous membrane having a gas side and a liquid side. The yeast slurry flows over the liquid side of the membrane; oxygen is delivered to the gas side of the membrane and passes through the pores to the yeast slurry.

8 Claims, 2 Drawing Sheets

METHOD OF OXYGENATING YEAST SLURRY USING HYDROPHOBIC POLYMER MEMBRANES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Brewer's yeast is used as a biocatalyst to promote fermentation of carbohydrates to ethanol in the production of beer and other fermented beverages. In brewing, fermentation is performed by mixing brewer's yeast with a source of fermentable carbohydrate (usually wort) and incubating the mixture under conditions suitable for fermentation.

Commonly, wort is inoculated or "pitched" with yeast harvested from a previous fermentation. Generally, pitching yeast has experienced anaerobic conditions during fermentation. Before a subsequent fermentation can occur, the anaerobic pitching yeast must first synthesize essential lipid components, including sterols and unsaturated fatty acids. Synthesis of these lipids requires oxygen and a sufficient reserve of glycogen.

A conventional approach to insuring sufficient oxygen for yeast to synthesize lipids has been to aerate the wort. However, by this method, the level of oxygen in the wort must be carefully controlled to ensure a consistent product. Sub-optimal oxygen levels cause slow fermentation. High levels of oxygen in the wort can cause rapid fermentation, which leads to alterations in the beer flavor and overfoaming.

U.S. Pat. No. 899,756 discloses a method of enhanced fermentation that includes aerating or oxygenating wort after pitching with the yeast culture. Aerating the wort after pitching is routinely done in the brewing industry to promote fermentation. However, it is thought that aerating the yeast in wort may contribute to the production of staling precursors.

Attempts to develop ways of aerating or oxygenating yeast slurries prior to pitching have been made. An important consideration in developing such methods is how to deliver oxygen to the yeast at a rate that approaches the rate of oxygen uptake by yeast. A dense brink yeast slurry for pitching has an oxygen uptake rate (r) of about 5 mg/min/liter. If the slurry were saturated with air, the dissolved oxygen level would be about 10 mg/liter. The yeast in this slurry can take up this oxygen in 2 minutes.

Several systems described in literature were devised that supply oxygen at a rate sufficient to meet the high oxygen demand of yeast.

UK Patent Application GB 2 197 341 discloses a method of aerating yeast prior to fermentation in which the pitching yeast is first diluted with water and then exposed to oxygen for a period of time until the yeast reaches its maximum rate of oxygen consumption. The yeast is then used to pitch oxygen-free wort. In this system, oxygen is supplied through a fritted gas distributor. Oxygen thus supplied enters the slurry in the form of small gas bubbles that cause foaming, especially at higher supply rates, which increase bubble size. To reduce foaming, the yeast slurry was diluted 10-fold, thereby reducing the oxygen requirement by 10 times.

Belgian patent Be 1010885A3 discloses a method of oxygenating yeast by means of a micro-porous ceramic membrane contactor through which a dense yeast slurry is circulated. The aluminum oxide membrane has an average pore size of 0.5 micron. In order for the oxygen to pass through the membrane, a higher pressure must be maintained on the gas side of the membrane, relative to the pressure on the liquid side of the membrane. Under these conditions, oxygen enters the yeast slurry as micro bubbles. In this system, formation of foam is reduced but not eliminated. Because of the smaller bubble size and the large number of pores per unit surface area, this method affords improved mass transfer of oxygen to the yeast slurry over that of the method disclosed in GB 2 197 341. However, mass transfer is not optimal because oxygen supplied in the form of bubbles is slow to dissolve because the bubbles move along with the liquid, causing a relatively large liquid boundary layer and a slow dissolution rate. Delivery of sufficient oxygen to the yeast by this method would depend on providing a very large contactor made of relatively expensive ceramic material.

U.S. Pat. No. 5,565,149 discloses a method for delivering oxygen with a membrane system that supplies oxygen without forming bubbles. The membrane is 99.9% non-porous. Oxygen is transferred across the membrane by diffusion. The efficiency of oxygen transfer and the oxygen transfer rate are reduced by the additional diffusion step.

Oxygenating the yeast prior to pitching is known to be superior to oxygenating the wort in terms of producing a consistently good product. Despite this, yeast oxygenation prior to pitching is not generally practiced in breweries because of difficulties associated with supplying oxygen to pitching yeast at a rate sufficient to keep up with the very high oxygen uptake rate of the yeast. Those systems described in literature that report high oxygen supply rates are uneconomical or cause excessive foaming.

There remains a need in the art for an economical method of aerating or oxygenating that does not cause foaming.

BRIEF SUMMARY OF THE INVENTION

The present invention includes an economical method of efficiently oxygenating yeast slurry prior to pitching comprising passing the yeast slurry through a membrane contactor having at least one microporous hydrophobic polymeric membrane, the membrane having a gas side and a liquid side, wherein the contactor is connected to an oxygen source, and wherein at least a portion of the yeast slurry is in proximity to the membrane on the liquid side, and delivering oxygen from the oxygen source through the membrane to the yeast slurry.

It is an object of the invention to provide a cost-effective method of oxygenating yeast slurry.

It is a further object of the invention to provide a method that allows efficient transfer of oxygen to an undiluted yeast slurry.

It is an advantage of the present invention that the yeast slurry may be oxygenated with essentially no foaming of the slurry.

Other objects, features, and advantages of the invention will become apparent upon review of the specification.

DETAILED DESCRIPTION OF THE INVENTION

The present invention provides an economical method of oxygenating or aerating yeast slurry prior to pitching that does not cause foaming. (The terms "oxygenate" or "aerate" are used interchangeably herein; for ease of reading, the term oxygenate will be used throughout the remainder of the specification). Oxygenating yeast prior to pitching allows the yeast cells to obtain sufficient oxygen to synthesize sterols and fatty acids, which are needed for cell growth during the fermentation process. By oxygenating the yeast slurry rather than the wort, greater consistency of the final product may be attained with reduced levels of staling precursors.

In the method of the invention, undiluted yeast is oxygenated by means of a microporous hydrophobic polymeric membrane across which gas may be exchanged. The membrane provides a high surface area contact between the liquid yeast slurry without direct mixing. The high surface area to volume ratio provides a high specific surface area for mass transfer. The method by which oxygen is delivered to the slurry does not cause the formation of foam-producing bubbles. In addition minimizing foam, the present invention allows operation at higher $K_L$ values.

Figure 1:
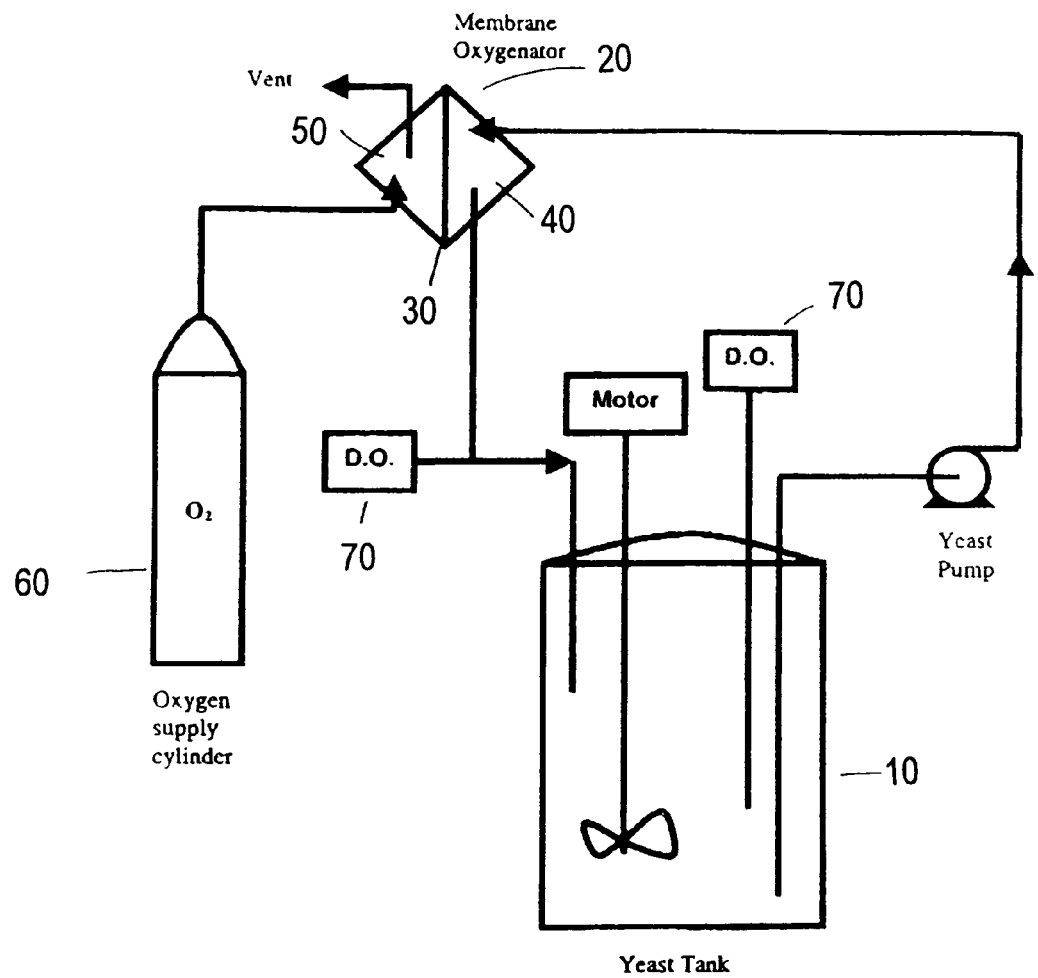
FIG. 1 shows the flow of yeast slurry from a tank to an oxygenation membrane and the return of the oxygenated slurry to the tank.

With reference to FIG. 1, in a preferred embodiment of the invention, yeast slurry is contained in a tank 10. A portion of the yeast is transferred from the tank 10 to a membrane oxygenator 20 equipped with at least one microporous hydrophobic membrane 30 having a liguid side 40 and a gas side 50. The slurry is passed over the liquid side 40 of the membrane. Oxygen gas from an oxygen tank 60 is delivered into the gas side 50 of the membrane and passes across the membrane to the slurry. Oxygenated yeast slurry is returned to the tank 10. Optionally, the system may include means 70 for measuring dissolved oxygen in the slurry.

The oxygen uptake rate in a yeast suspension can be calculated from the measured dissolved oxygen evolution profiles at any time during oxygenation using the following equations:

The oxygen mass balance can be written as:

$$\frac{VdC}{dt} = F(C_d - C) - rV \quad (1)$$

where C and $C_d$ are the dissolved oxygen concentrations (mg/L) in the yeast slurry and the oxygenator discharge, respectively, V is the slurry volume (L), F is the slurry flow rate through the oxygenator (recirculation rate, L/min), and r is the instantaneous oxygen uptake rate (mg/min-L) of the yeast after time (t) in the oxygenator, measured in minutes.

Equation (1) may be rearranged to calculate the oxygen uptake rate from the measured dissolved oxygen concentrations and the rate of change of dissolved oxygen in the yeast tank:

$$r = \frac{F}{V}(C_d - C) - \frac{dC}{dT} \quad (2)$$

The oxygen uptake rate r is usually expressed in mg $O_2$/min/$10^9$ cells. The mass transfer efficiency is usually expressed by the factor $k_L a$ in which $k_L$ is the mass transfer coefficient (cm/min) and a is the interfacial area between gas and liquid divided by the liquid volume in $cm^{-1}$. As can be seen from the following equation, there are four parameters that may be varied to allow oxygen to be supplied at a rate sufficient to keep up with a high r value:

$$r = k_L a * V_{oxygenator}/V_{slurry} * V_{slurry}/10^9 cells * (C^* - C)$$

wherein $C^*$ is the concentration of oxygen in the liquid in equilibrium with the partial pressure of oxygen in the gas.

In designing the method of the invention, the following changes to variables affecting the rate of oxygen uptake were considered:

(1) Increasing the $k_L a$. As shown in the examples, the method of the invention affords a $k_L a$ value that is at least an order of magnitude greater than the maximum previously reported $k_L a$ value (Masschelein, C. A. et al. Congress Proceedings, European Brewing Conference, 1995, 377–386).

(2) Increasing the ratio of the volume of the oxygenation system to the volume of the yeast slurry. Even with a relatively low $k_L a$ value, as in the system disclosed in Be1001885A3, sufficient oxygen can be supplied by increasing the volume of the oxygenation system relative to the volume of the yeast slurry. However, this option is uneconomical, especially if expensive membrane materials such as ceramic are used.

(3) The oxygen supply requirement may be reduced by diluting the yeast slurry, as disclosed in GB 2197341. This option requires larger equipment and is also uneconomical.

(4) Increasing the difference in oxygen concentration between the gas and liquid phases ($C^* - C$). This difference is the driving force for gas transfer, but this parameter is limited in all systems. In the bubble transfer systems, an increase in gas delivery pressure or flow rate will produce larger bubbles that cause greater foaming and a lower $k_L a$ value. In the bubble-free transfer system of the present invention, an increase in gas pressure requires a pressure increase on the liquid side, because the liquid pressure must be higher than the gas pressure to prevent bubble formation.

In the method of the present invention, the system gas is supplied in the form of molecular oxygen ($O_2$). The oxygen is supplied using a hydrophobic membrane system. By this method, the pressure on the liquid side is kept higher than the pressure on the gas side to prevent the gas from passing through the membrane as bubbles. Reduced bubble formation has the advantage of greatly reducing or eliminating foam formation.

Because the membrane is hydrophobic, the liquid does not penetrate the pores and the gas-liquid interface is maintained on the liquid side of the membrane. High $k_L a$ values can be achieved by renewing the liquid surface continuously through the application of a high cross flow velocity.

In the initial evaluation of the invention, a hydrophobic membrane oxygenator of the type used as a blood oxygenator (Model Max-FTE, Medtronic, Minneapolis, Minn.) was employed, with the yeast slurry flowing at a cross flow to the membranes. As disclosed in U.S. Pat. No. 4,975,247 (incorporated by reference herein) this type of mass transfer device comprises hollow fiber membranes. Yeast slurry flowed about the exterior (liquid side) of the fibers and oxygen was delivered to the interior of the fibers (gas side).

In the examples, a portion of the yeast slurry was pumped to the membrane contactor at a flow rate of about 800 ml/min. The residence time of the slurry in the contactor was about 9 seconds. The average velocity was about 41 cm/min in the fiber bed and the superficial velocity (flow rate/cross sectional area of the fiber bed) was about 13.7 cm/min.

One of ordinary skill in the art will appreciate that one may vary these parameters and still achieve acceptable oxygenation, provided that the $k_L a$ value is high. The $k_L a$ values employed in the examples were in the range of from about 0.1 sec$^{-1}$ to about 0.4 sec$^{-1}$. It is expected that other $k_L a$ values will give acceptable results using the method of the invention, provided that the $k_L a$ is at least about 0.005 sec$^{-1}$. More preferably, the $k_L a$ is at least about 0.1 sec$^{-1}$. More preferably still, the $k_L a$ is 0.4 sec$^{-1}$ or greater.

One skilled in the art will-appreciate that in addition to the membrane contactor disclosed in the examples, there are other membrane configurations that are also suitable for use in the invention. It is expected that spiral wound, vibrating, rotary and tubular hollow fiber membranes may also be used in the practice of the invention.

The membrane contactor used in the examples is suitable for relatively small fermentation volumes. One of skill in the art would appreciate that for relatively large fermentations, one would wish to use a larger contactor.

In the method of the invention, yeast slurry flows over the liquid side of the membrane and oxygen is delivered to the gas side. In the examples below, the flow path of the yeast slurry within the fiber was in a direction substantially perpendicular to the fiber axis (cross flow). It is expected that parallel and counter current flows may also be successfully employed.

The hydrophobic membrane contactor used in the examples below comprises a plurality of hollow fiber membranes having an inner diameter of about 200 um and an outer diameter of about 300 um. Hollow fiber membranes having an outer diameter in the range of from about 10 um to about 3 mm, and an inner diameter in the range of from about 5 um to about 2.9 mm are expected to be suitable in the practice of the present invention.

The membranes have a plurality of pores through which oxygen may be transferred. The membranes used in the examples had a pore size of about 0.03 um. However, membranes having larger or smaller pore sizes may be used, provided that the pore size is sufficiently large to allow oxygen to transfer across the membrane but not so large as to allow liquid to break through the membrane at the operating transmembrane pressure differential. Suitable micro-porous membranes should have pores in the range of from about 0.1 nm to about 2 um.

The membranes used in the examples have a porosity of about 40% of the membrane contact area. The porosity is percentage of membrane area that is open. It is expected that membranes having a porosity in the range of from about 2% to about 95% would be suitable in the practice of the present invention.

The membranes used in the examples were made of micro-porous polypropylene. The membranes may be made from any suitable nonreactive, hydrophobic polymeric material. Such materials include, but are not limited to, polypropylene, polysulfone, polytetrafluoroethylene (PTFE or Teflon), polyvinylidenedifluoride, polyvinylidenedichloride, and polyethylene.

Molecular oxygen is delivered in an oxygen-containing gas. Preferably, the molecular oxygen is deliver as oxygen gas containing greater than 10% oxygen. Optionally, the oxygen may be delivered as air, oxygen-enriched air, or any other suitable gas containing oxygen.

In the examples, oxygen was delivered at a flow rate of 0.25 L/min. Lower or higher rates may be employed, as long as oxygen is provided at a rate that is at least is at least two fold greater than the expected oxygen uptake rate. Still more preferably, the oxygen delivery rate is at least five fold greater than the oxygen uptake rate.

The yeast used in the examples below was an undiluted brink yeast used in lager beer fermentations at Miller Brewing Company. One of ordinary skill in the art that the practice of the present invention would appreciate that the invention may be used to oxygenate any type of yeast used in fermentations.

Preferably, the yeast slurry of the present invention comprises from about 40 g/L yeast (dry weight) to about 80 g/L yeast (dry weight). However, one wishing to dilute the yeast to less an 40 g/L prior to oxygenating may do so.

In the examples below, the temperature of the yeast slurry was maintained at about 60° F. during oxygenation. This temperature was chosen because that it is the typical fermentation temperature of the particular yeast used in the examples. However, it should be appreciated that temperature during oxygenation is not critical to the practice of the invention. The yeast slurry may be oxygenated at ambient temperature, or the yeast may be maintained at a desired temperature or range of temperatures during oxygenation using a temperature control system. The temperature of the yeast slurry may be controllably altered during the course of oxygenation by using a programmable temperature control system. Conveniently, the oxygenation may be conducted at a temperature close to the temperature at which subsequent fermentations will be conducted.

Following oxygenation, the yeast may be used for pitching. Fermentation is allowed to proceed using standard fermentation conditions. Depending on the brewer's objective, the yeast may be used to pitch aerated or unaerated wort.

If the primary objective is affecting or controlling flavor profiles or to prevent formation of staling precursors, nonaerated wort should be used in the fermentation. As shown in the examples, fermentations in which nonaerated wort was pitched with yeast oxygenated by the method of the invention were characterized by substantially decreased production of higher alcohols and increased production of esters. Esters are generally considered to confer desirable flavors to beer.

It is envisioned that the method of the invention may be used to obtain high fermentation rates by using oxygenated yeast to pitch aerated wort. Preferably, fermentation may be completed in a shorter time using yeast aerated by the method of the invention than by conventional fermentation methods, in which aerated wort is pitched with non-aerated yeast slurry.

In addition to pitching and fermentation, yeast oxygenated by the method of the invention may be used in other aspects of the brewing process, including krauesening, lagering, or any other application in which yeast is generally used. It is envisioned that oxygenated yeast may also be used in the wine industry to manipulate flavor.

In the examples below, the yeast slurry was decarbonated and stripped of entrained oxygen prior to oxygenating yeast. This step was included to ensure accurate measurements of oxygen concentrations during the course of oxygenation. This step may be omitted, particularly if the primary objective of yeast oxygenation is to boost fermentation rates in subsequent fermentations.

The following nonlimiting examples are intended to be purely illustrative.

Materials

Whole yeast suspensions (40 to 80 grams dry weight/L, ~10 to 12 L) were employed as yeast slurries in the oxygenation studies.

The membrane oxygenator used in the studies is sold as a blood oxygenator by Medtronic (Minneapolis, Minn.). The membrane has a surface area of about 2.4 $m^2$ and a liquid hold-up volume of approximately 120 ml.

Oxygenation of Yeast Slurries

Yeast was oxygenated by a process as represented schematically in FIG. 1. A yeast suspension was placed in a 12 liter stainless steel tank ("yeast tank") equipped with an overhead agitator for continuous mixing. The temperature of the yeast slurry was maintained at a predetermined, constant temperature (60° F.) by means of a temperature control system. The tank was equipped with ports for transferring the yeast from the tank to a membrane oxygenator and returning the oxygenated yeast from the oxygenator to the tank. The tank included an additional port connected to a sensor for measuring dissolved oxygen. The system was equipped with an additional oxygen sensor that allowed the dissolved oxygen in the yeast slurry to be measured as the yeast was discharged from the oxygenator.

In order to ensure accurate measurements, the yeast slurry was decarbonated and stripped of any oxygen entrained during the vessel filling prior to beginning the oxygenation experiments. Decarbonation and deoxygenation was accomplished by purging the membrane oxygenator with nitrogen gas at ambient pressure while the yeast is circulating. After the yeast suspension was decarbonated, deoxygenated, and had achieved the desired temperature (e.g., 60° F.) (10 to 30 minutes), the nitrogen purge was discontinued and oxygen supply initiated at ambient pressure.

Yeast slurry was transferred from the tank to the membrane oxygenator at a rate of 0.8 L/min. Oxygen was delivered from an oxygen supply cylinder to the oxygenator at a rate of about 0.25 L/min. Residence time for the yeast slurry in the oxygenator was about nine seconds.

The dissolved oxygen levels in the yeast suspension in the tank as well as at the oxygenator discharge were recorded continuously. Yeast samples were collected every several hours and were used to inoculate separate beer fermentations. An aliquot of each yeast sample collected was analyzed for sterols content.

Performance of Oxygenated Yeast in Beer Fermentation

Yeast oxygenated as described above was pitched into fermentors containing 2 L volumes of sterile wort to a target $12 \times 10^6$ cells $mL^{-1}$. The fermentors were vented through thermal mass flowmeters to measure fermentation rates on-line. Daily samples were taken from the vessels to determine the pH and extract content. Total cell growth and cell viability were determined at the end of fermentation by hemocytometer cell counts.

Yeast oxygenated by the method of the invention was pitched in both oxygenated and nonoxygenated wort. The time required to reach the end of fermentation (defined the time when the carbon dioxide evolution rate reaches 0.4 ml/min·L) as a function of the time of yeast oxygenation is shown in FIG. 2 for both aerated and nonaerated wort.

Figure 2:
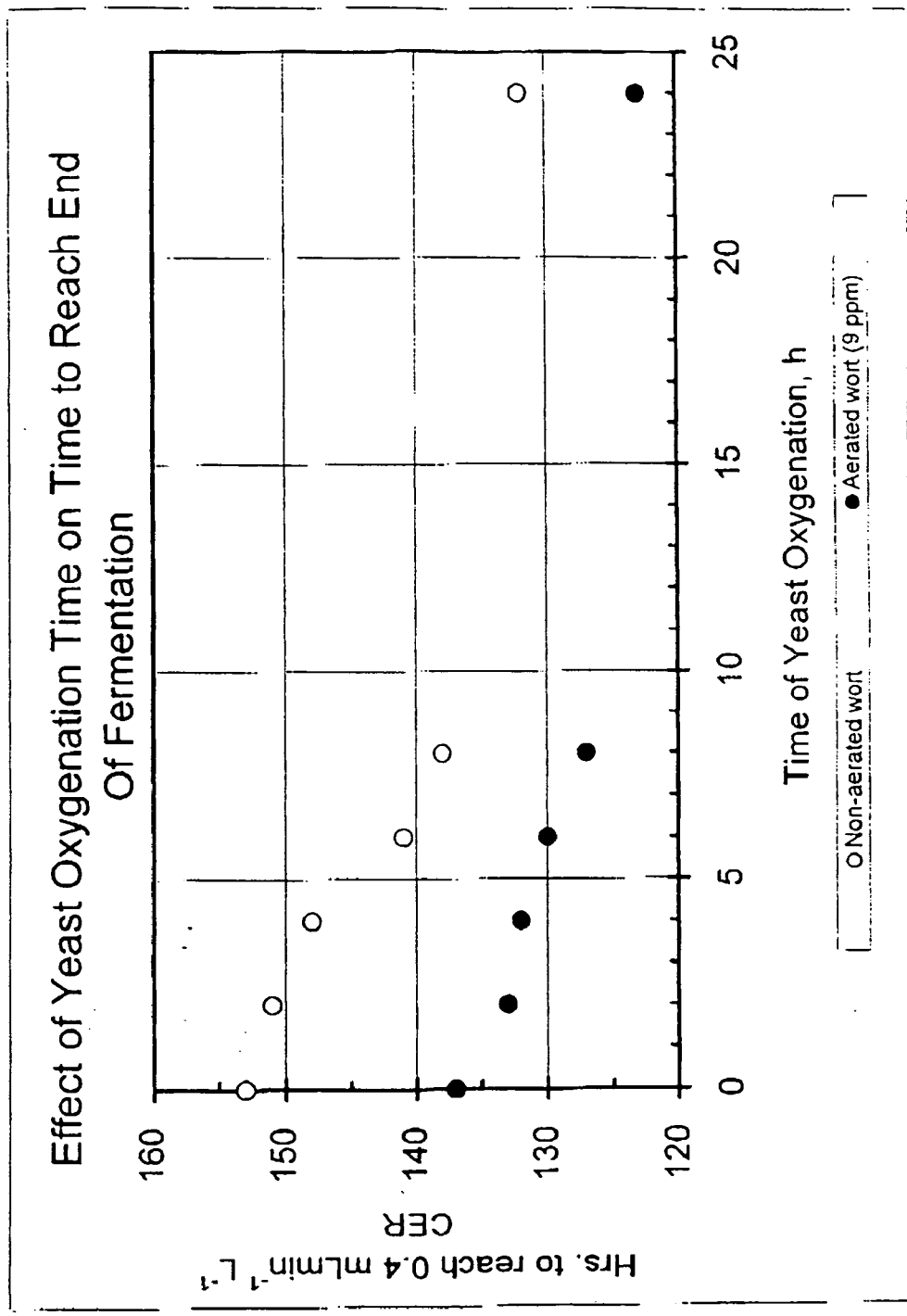
FIG. 2 shows fermentation times for aerated and nonaerated wort as a function of yeast oxygenation time.

As can be seen from FIG. 2, fermentation rates of aerated (closed circles) or nonaerated (open circles) wort was increased by pitching with oxygenated yeast. Fermentations using nonoxygenated wort and pitched with yeast aerated about 8–10 hours had fermentation times approximately the same as those obtained with aerated wort pitched with nonoxygenated yeast (closed circle time zero). Yeast viability was not affected by oxygenation. Yeast growth was reduced, which resulted in reduced fusel oil and increased esters.

Fermentations in which nonaerated wort was pitched with yeast oxygenated by the method of the invention showed a 10% decrease in production of higher alcohols and a 5% increase in production of esters.

The present invention is not limited to the exemplified embodiments, but is intended to encompass all such modification and variation as come within the scope of the following claims.

We claim:

1. A method of fermenting a liquid medium with a yeast slurry from a previous fermentation, the method comprising the steps of:
    (a) providing an undiluted yeast slurry from a previous fermentation having 40 g/l yeast to 80 g/l yeast on a dry weight basis, wherein the yeast experienced anaerobic conditions in the previous fermentation;
    (b) passing at least a portion of the yeast slurry through a membrane contactor, the contactor comprising at least one hydrophobic, microporous membrane, the membrane having a liquid side and a gas side, wherein the contactor is connected to an oxygen source, and wherein at least a portion of the yeast slurry is in proximity to the membrane on the liquid side;
    (c) delivering oxygen from the oxygen source to the gas side of the membrane under conditions that cause at least a portion of the oxygen to transfer from the gas side of the membrane to the yeast slurry such that the $k_L a$ is at least 0.005 $sec^{-1}$ and wherein said transfer of oxygen to the yeast slurry is bubble-free;
    (d) determining an oxygen uptake rate of the yeast slurry;
    (e) increasing an oxygen delivery pressure on the gas side of the membrane and increasing a liquid pressure on the liquid side of the membrane in dependence on the oxygen uptake rate wherein the liquid pressure on the liquid side of the membrane is kept higher than the oxygen delivery pressure on the gas side of the membrane; and
    (f) thereafter pitching a liquid medium with the yeast slurry.

2. The method of claim 1, wherein the yeast slurry is circulated in a closed system between a yeast tank and the membrane contactor.

3. The method of claim 1, wherein the medium is wort.

4. The method of claim 3, wherein the wort is aerated prior to pitching.

5. The method of claim 3, wherein the wort is not aerated prior to pitching.

6. The method of claim 1, wherein the $k_L a$ is at least 0.1 $sec^{-1}$.

7. The method of claim 1, wherein the $k_L a$ is at least 0.4 $sec^{-1}$.

8. The method of claim 2 wherein:
    the oxygen uptake rate of the yeast slurry is determined from a first dissolved oxygen concentration reading taken in the yeast tank and a second dissolved oxygen concentration reading taken downstream of the membrane contactor.

* * * * *

UNITED STATES PATENT AND TRADEMARK OFFICE
CERTIFICATE OF CORRECTION

| | | |
|---|---|---|
| PATENT NO. | : 7,186,428 B1 | Page 1 of 1 |
| APPLICATION NO. | : 09/448578 | |
| DATED | : March 6, 2007 | |
| INVENTOR(S) | : Nick J. Huige et al. | |

It is certified that error appears in the above-identified patent and that said Letters Patent is hereby corrected as shown below:

At column 4, line 34, "Be1001885A3" should be -- Be1010885A3 --.

At column 6, line 24, "an" should be -- than --.

Signed and Sealed this

Twenty-sixth Day of June, 2007

JON W. DUDAS
*Director of the United States Patent and Trademark Office*